Oct. 31, 1967 TOSHIO KATANO 3,349,499
METHOD FOR DRYING RAW MATERIAL CHIPS OF SYNTHETIC RESIN
Filed March 18, 1965
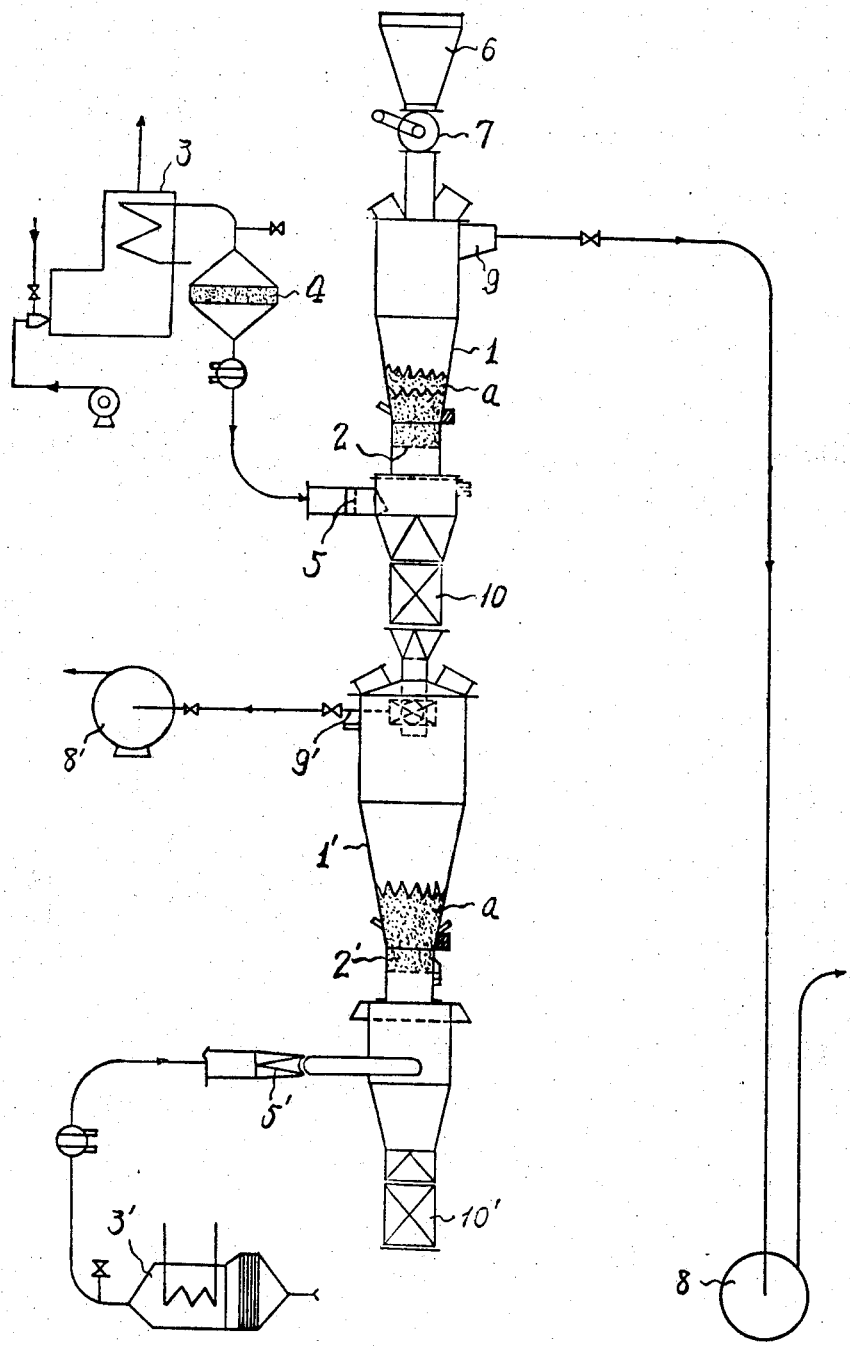
INVENTOR.
TOSHIO KATANO.
BY
ATTORNEY.

United States Patent Office 3,349,499
Patented Oct. 31, 1967

3,349,499
METHOD FOR DRYING RAW MATERIAL
CHIPS OF SYNTHETIC RESIN
Toshio Katano, 80 Samezucho, Ooi, Shinagawa-ku,
Tokyo, Japan
Filed Mar. 18, 1965, Ser. No. 440,728
5 Claims. (Cl. 34—10)

The present invention relates to the process for drying the raw material chips of synthetic resin.

The raw material chips of synthetic resin, especially the raw material chips of polyester type resin, contain about 0.5% of water, and it is necessary to dry the same up to 0.01%.

According to the conventional methods for drying off the contained water-portion, the raw material chips are dried by heating the same while preventing the adhesion of said chips to each other by stirring the same, or along with other granular substance, the said chips are heated while stirring the same, and after drying thus obtained mixture, the said two substances are separated.

Generally speaking, polyester type resin chips have such a property as to create adherability on the surface thereof at the temperature between 100–130° C., and on the other hand in order to dry said chips to such a degree that the amount of water-portion the center of a chip, it is necessary to heat the same about the temperature below 180° C.

The purpose of the present invention is to provide such a method as to dry synthetic resin raw material chips, especially polyester type resin chips without causing the adhesion thereof.

The inventor of the present invention has found, as a result of his researches, the fact that synthetic resin raw material chips create the adherability on the surface thereof at the temperature between 100–130° C., and at the same time the inventor of the present invention has found the fact that at the temperature below 100° C., for example below 97.5° C., the said chips not only create no adherability on the surface thereof, however, he has also found the fact that, there is no fear that the chips pretreated for a certain period of time, for example, the chips heated at 80° C. for 30 minutes, and the chips heated at 95° C. for 15 minutes should possess the adherability even if they are heated at the temperature below 180° C. or so.

In other words, the present invention is characterized in that in order to attain the aforementioned purposes, first, as the pre-treatment, the said chips placed on perforated plate are subjected to the pre-treatment by heating the same at the temperature ranging from below 100° C. to over 80° C. for a given period of time; as to the temperature, the most preferable temperature is about 90° C., although at the temperature below 80° C., for example at 75° C., the same result can be obtained when the heating time is prolonged, but it is not economical; thereafter the full scale drying treatment is carried out thereagainst.

The following are the examples showing the application of the present invention by employing the means as shown in the attached drawing.

The attached drawing is the drawing showing an example of the means employed in the present invention. In the drawing, 1 is a can used in the means for pre-treatment, and 2 shows the reversible perforated plate. The said perforated plate has a number of apertures smaller than said chips, and is supported with the shaft of the diametrical direction thereof, and can be turned over from outside of the said can. 3 is the means for heating air, and 4 is the means for filtering air, and 5 is a hot air blowing pipe for the said can, and 6 is a hopper for feeding raw material, and 7 is a rotary valve. 8 is an air-blower, and absorbs the air inside the can 1 from an exhaust pipe 9. 10 is the rotary valve which partitions the pre-treatment means from the full scale drying means.

The following is an example of conducting said pre-treatment of the present invention by employing the said pre-treatment means.

Polyester raw material chips containing 0.5% of water is supplied onto the perforated plate 2 inside the can 1 from the hopper 6, and hot air at the temperature of 90° C. is sent to the lower part of the perforated plate 2 inside the can 1 through the air filtering means 4 and hot air blowing pipe 5 from the air heating means 3, and while sending hot air, chips a are fluidized, and about fifteen minutes later the perforated plate 2 is turned over and the said chips a are let fall onto the rotary valve 10, and are sent over to the full scale drying means. The said full scale drying means are similar to the said pre-treatment means, and the details of the said full scale drying means are as follows:

In the drawing, 1' is a can; 2' is the reversible perforated plate; 3' is air heating means; 4' is air filtering means; 5' is a hot air blowing pipe; 8' is an air-blower; 9' is an air exhausting pipe; 10' is the rotary valve for removing dried chips; and the structure of these parts is the same with that of the said pre-treatment means.

In the full scale drying means, it is different from said pre-treatment means in that in the full scale drying means an hot air at the temperature below about 180° C. is sent beneath said perforated plate.

According to the method of the present invention, by once subjecting chips to the pre-treatment which comprises heating the said raw material chips at the temperature below 100° C. for a certain period of time, even if said chips are heated at the temperature of below 180° C. or so, which is necessary for drying said chips, the said chips do not adhere to each other, and this is accounted as an advantage of the method of the present invention.

What is claimed is:

1. A method for drying raw chips of synthetic polyester resin material comprising:
   (a) pre-treating said chips by exposing them to a moving stream of gas at a temperature between 70° C. and 100° C. and
   (b) thereafter exposing said chips to a moving stream of gas at a higher temperature.

2. The method of claim 1, said first mentioned temperature being approximately 90° C.

3. The method of claim 2, said temperature in step (b) being approximately 180° C.

4. The method of claim 1, said temperature in step (b) being approximately 180° C.

5. The method of claim 1, said temperature in step (a) being 95° C. and said chips being exposed to aid stream for 15 minutes.

References Cited

UNITED STATES PATENTS 3,238,634   3/1966   Goins _____ 34—10

FOREIGN PATENTS

| | | |
|---|---|---|
| 630,623 | 7/1963 | Belgium. |
| 691,669 | 6/1964 | Canada. |
| 1,327,555 | 4/1963 | France. |
| 1,028,062 | 5/1966 | Great Britain. |

FREDERICK L. MATTESON, JR., *Primary Examiner.*

JOHN J. CAMBY, *Examiner.*